United States Patent [19]

Hartmann et al.

[11] Patent Number: 4,568,353

[45] Date of Patent: Feb. 4, 1986

[54] PROCESS OF PRODUCING COARSE, PURE POTASSIUM CHLORIDE CRYSTALS

[75] Inventors: Horst Hartmann, Bad Homburg; Manfred Beckmann, Neu-Isenburg; Walter Bauer, Reichelsheim, all of Fed. Rep. of Germany

[73] Assignee: Metallgesellschaft Aktiengesellschaft, Frankfurt am Main, Fed. Rep. of Germany

[21] Appl. No.: 472,224

[22] Filed: Mar. 4, 1983

[30] Foreign Application Priority Data

Mar. 4, 1982 [DE] Fed. Rep. of Germany ....... 3207778

[51] Int. Cl.$^4$ ............................................. B01D 9/02
[52] U.S. Cl. ................................. 23/296; 23/302 R; 159/47.1; 159/DIG. 8
[58] Field of Search ............ 23/296, 298, 300, 302 R, 23/302 T, 303; 159/47.1, 17 R, DIG. 8

[56] References Cited

U.S. PATENT DOCUMENTS

| 3,365,278 | 1/1968 | Kelly et al. | 23/296 |
| 3,384,459 | 5/1968 | Carter et al. | 23/296 |
| 4,224,035 | 9/1980 | Geesen | 23/296 |
| 4,224,036 | 9/1980 | Geesen | 23/296 |
| 4,224,037 | 9/1980 | Geesen | 23/296 |

FOREIGN PATENT DOCUMENTS 781194 11/1980 U.S.S.R. .

Primary Examiner—Peter Hruskoci
Assistant Examiner—W. Gary Jones
Attorney, Agent, or Firm—Karl F. Ross; Herbert Dubno

[57] ABSTRACT

In a process of producing coarse pure potassium chloride crystals from feed solutions containing potassium chloride and other impurities, comprising cooling the solution under a vacuum in a plurality of stages connected in series, withdrawing by means of a conveyor the potassium chloride which has been crystallized in each stage, withdrawing the water vapors, collecting crystalline potassium chloride from the solution, drying the crystalline potassium chloride and separating the same into several fractions, compacting the fine fraction and cooling and aminating the end product, the potassium chloride content of the feed solution is increased in that potassium chloride from one or more of the stages containing solution at a low temperature is recycled to the feed solution before the latter enters the first stage. The temperature of the mixture of feed solution and recycled potassium chloride is maintained only slightly below the temperature of the feed solution, potassium chloride product is withdrawn at the desired rate from one or more of the stages which contain solution at a higher temperature, the vapors formed are withdrawn and are condensed by a direct or indirect cooling.

4 Claims, 1 Drawing Figure

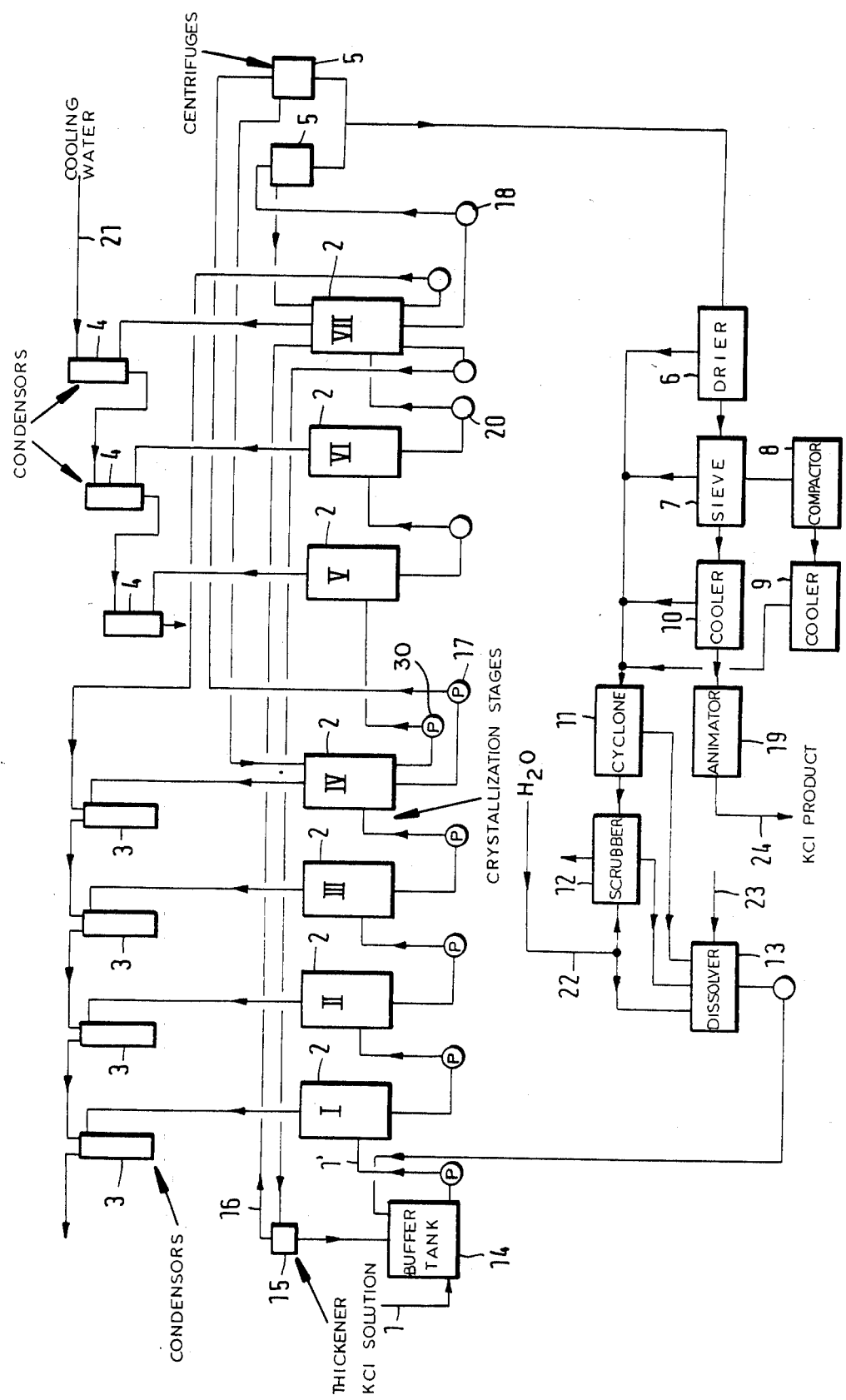

PROCESS OF PRODUCING COARSE, PURE POTASSIUM CHLORIDE CRYSTALS

FIELD OF THE INVENTION

Our present invention relates to the production of potassium chloride (KCl) in crystalline form and, more particularly, to the production of coarse, large-grain, pure crystals of potassium chloride.

BACKGROUND OF THE INVENTION

It is known that potassium chloride crystals can be recovered from feed solutions which contain sodium chloride and other impurities by cooling the solution under a vacuum. In this operation, water is evaporated and the latent heat of evaporation is removed from the solution to be cooled. The steam which is generated is used to heat the process liquor (German patent publication No. 10 59 418).

A disadvantage of these and similar processes is that the crystals resulting from such cooling are smaller than those obtained from crystallization in upright vessels. Because additional quantities of water are evaporated, larger quantities of fresh process liquor must be produced. Besides, the potassium chloride which was recovered tends to harden in storage. Another disadvantage is that the crystals contain minor amounts of sodium chloride and process liquor adheres to the crystals.

The quantity of these impurities can be reduced by covering potassium chloride with liquids in which potassium chloride does not dissolve. The covering operation is usually effected in two stages. Water is added first to dissolve the impurity constituents and to form a cover liquor, which in an additional operation is separated from the underlying solids, i.e. the potassium chloride (Freiberger Forschungshefte, A 267, pages 191/192, Leipzig 1963). The covering effect of the cover liquor is, however, reduced by the presence of magnesium chloride and magnesium sulfate (Winnacker-Küchler, Chemische Technologie, Vol 1, 3rd edition, page 127, 1970).

OBJECTS OF THE INVENTION

It is an object of the invention to avoid these and other disadvantages of the prior art and to recover coarse potassium chloride crystals of high purity with high yields from feed solutions which contain sodium chloride and other impurities.

Another object of the invention is to provide a process for producing high-purity, coarse, large-grain KCl crystals whereby the disadvantages of prior-art techniques are reduced or avoided and the process can be carried out economically.

Still another object of the invention is to provide an improved method of obtaining coarse-grain KCl crystals from feed solutions containing NaCl and other impurities which is ecologically sound and does not generate environmentally detrimental wastes.

SUMMARY OF THE INVENTION

These objects are attained according to the invention in that the potassium chloride content of the feed solution is increased by recycling potassium chloride from one or more of the stages containing solution at a low temperature to the feed solution before the latter enters the first stage, the temperature of the mixture of feed solution and recycled potassium chloride is maintained only slightly below the temperature of the feed solution, potassium chloride product is withdrawn at the desired rate from one or more of the stages which contain solution at a higher temperature, and the vapors formed are withdrawn and are condensed by direct or indirect cooling.

It is preferred to recycle a mixture consisting of 10 to 30% by weight potassium chloride and 70 to 90% by weight water into the feed solution. In some cases it is desirable to increase the concentration of the mixture to a content of 50 to 70% by weight potassium chloride and 30 to 50% by weight water before the mixture enters the first stage.

According to a preferred feature of the invention, an overflow effluent is withdrawn from each stage and a major portion of the fine potassium chloride is separated from the overflow effluent from each stage and is dissolved by an addition of condensate and then recycled to the stage from which the overflow effluent has been withdrawn.

According to another feature of the invention the mother liquor which remains after the crystalline potassium chloride has been separated is recycled to the stage from which the mother liquor has been withdrawn and the fine potassium chloride crystals contained in the mother liquor are dissolved by an addition of condensate to the mother liquor before the latter enters the stage to which it is recycled.

Moreover the particles can be spheriodized and reduced to a more uniform particle size in that the compacted potassium chloride is intensely mixed in a fluidized bed and cooled at the same time. The fines which are left are collected by centrifugation, e.g. by means of a cyclone, and are dissolved in condensate.

Those potassium chloride particles which are not collected by centrifugation are removed preferably by scrubbing and the resulting solution is used to dissolve the potassium chloride which has been collected in the centrifugal separators.

In order to increase the mean particle size of the potassium chloride it is of special advantage to withdraw the product only from the stages which are at higher temperatures and to feed the product to the centrifuges.

According to another preferred feature of the invention, the potassium chloride formed in those stages which contain solution at a lower temperature is withdrawn from the last stage and is recycled, possibly after an increase in its potassium chloride content before the raw solution enters the first stage.

The invention has a number of special advantages. The process is simple and yields coarsely crystalline potassium chloride which has a uniform particle size of about $d' = 1.0$ to $2.0$ mm and is free of dust particles.

The process is particularly economical and ecologically satisfactory. No deleterious dust particles or other substances are discharged into the atmosphere. The recycling of potassium chloride from the last or one of the last crystallizing stages into the hot feed solution before the latter enters the first stage of the process has the result that the fine potassium chloride crystals formed in the last stage or stages are also fully utilized in the formation of coarse potassium chloride crystals.

Because potassium chloride from one of the last stages, in which the potassium chloride content is low, the temperature is moderate and the crystal growth is slow, so that only fine crystals are formed, is recycled to the first stage or one of the first stages, which can be at a higher temperature, the crystals grow faster in the receiving stage to form coarse crystals. This increases the yield of coarse crystals and minimizes the loss of potassium chloride and results in a uniform particle size.

It is known to recycle salt at a certain rate from the last stages but that measure has previously been adopted only for seeding, i.e. for initiating the crystallization. In that case the rate at which salt is recycled is not significant in view of the total production rate. On the other hand, in the process according to the invention, potassium chloride is recycled at a rate which may amount up to or exceed one-third of the total production rate.

BRIEF DESCRIPTION OF THE DRAWING

The above and other objects, features and advantages will become more readily apparent from the following description and Example, reference being made to the accompanying drawing in which the sole FIGURE is a flow diagram of a plant for carrying out the process of the invention.

SPECIFIC DESCRIPTION

In the drawing, we have shown a conduit 1 which feeds the initial solution to a buffer tank 14 which also receives a recycle as previously described to produce a solution somewhat more concentrated in KCl (strenghtened solution) which is fed at 1' by a pump (all pumps or liquid or slurry conveyors are here designated by the reference character P) to the first crystallizer 2 of a first stage I. The subsequent crystallizer stages are represented at II through VII. The concentrated solution from each prior stage I through VI is fed by a respective pump to the next stage II through VII.

The crystallizers of the first four stages I through IV are each provided with a respective surface condenser 3 receiving vapor from the associated crystallizer 2, the cooling water being passed through the condenser 3 in series.

The crystallizers 2 of the stages V through VII are each associated with a mixing condenser 4, the output of each later-stage condenser being delivered to and mixed with the product of a prior-stage condenser.

The concentrate/slurry of the last stage IV of the first group of crystallizers 2 and the concentrate/slurry of the last stage VII of the second group of crystallizers can be delivered by pumps 17 and 18 respectively to centrifugal solids/liquid separators 5 (centrifuges). Pump 30 delivers part of the concentrate/slurry from the last stage IV of the first group to the first stage V of the second group of crystallizers.

The separated solids are fed by the centrifuges 5 to a drier 6 which is disposed upstream of a classifier 7 capable of sizing the dry solids, e.g. a sieving machine. For compaction of the fines, a compactor 8 is provided.

The solids-processing equipment also includes a fluidized bed cooler 9, another cooler 10, a cyclone 11, a scrubber 12 and a dissolving unit 13.

The resulting solution can be recycled from the dissolver 13 to the buffer tank 14 which can also receive a mother liquor from a thickener 15 having an overflow conduit 16. An animator 19 is connected to the cooler 10. Cooling water is supplied at 21, condensate or pure water for dissolution purposes is supplied at 22 and live steam can be supplied by the line or duct 23. Reference numeral 20 represents another salt sludge pump.

The product is recovered at 24.

EXAMPLE

A feed solution which contain 210 g KCl per liter, 170 g NaCl per liter (corresponding to an NaCl saturated solution), about 5.0 g $CaSO_4$ per liter and about 51.0 $MgCl_2$ per liter at a temperature of about 95° C. is supplied through conduit 1 to the first stage I of a crystallizing plant 2 consisting of seven stages. That feed solution is saturated with KCl at about 76.5° C.

Vapors at a total rate of about 175 metric tons per hour are formed in the several stages I or VII of the crystallizing plant 2 and are withdrawn from the top of each of the crystallizing stages I to VII.

The vapors from the stages I to IV of the crystallizing plant 2 are used to heat the dissolving liquor in the surface condensers 3. The vapors from stages V to VII are supplied to the mixing condensers 4 and are condensed in the latter in direct contact with cooling water 21.

The potassium chloride which has been collected in the centrifuges 5 is dried in the dryer 6 to a residual moisture content of about 0.15% by weight $H_2O$ and is separated into several fractions in the sieving machine 7.

Part of the fines which are smaller than 1.0 mm are processed in a compacter 8 to form particles having a size of 1 to 4 mm. In a succeeding fluidized bed cooler 9, the compacted KCl particles are cooled with air to a temperature of about 60° C. and are spheroidized and reduced to a more uniform particle size in the fluidized bed.

The fine salt which is formed in the dryer 6, the cooler 10 and the fluidized bed cooler 9 is separated in the succeeding cyclone 11 and the salt dust contained in the exhaust air from the cyclone is removed in the scrubber 12.

The KCl solution formed in the scrubber 12 is used in a dissolver 13 to dissolve the ultrafine salt which has been collected in the cyclone. In the dissolver 13, a solution which is at a temperature of about 100° to 108.5° C. and is almost saturated with KCl is produced by a treatment with live steam 23.

That solution is admixed in a buffer container 15 to the raw solution 1 before the latter enters the first crystallizing stage of the crystallizing plant. In this way the KCl content of that raw solution is increased.

The mixed solution resulting from the mixing of the recycled solution to the raw solution has a temperature of about 95.0° C. and approximately the following composition:

|       | grams per liter | % by weight |
|-------|-----------------|-------------|
| KCl   | 215             | 17.2        |
| NaCl  | 167             | 13.4        |
| $MgCl_2$ | 50           | 4.0         |
| $CaSO_4$ | 5            | 0.4         |
| $H_2O$   | 812          | 65.0        |
|       | 1249            | 100.0       |

The solution is saturated with KCl at 77.5° C. and it is undersaturated with about 4.5 g sodium chloride per liter.

The KCl content of the raw solution 1 is increased further in that a KCl in the form of a salt sludge is recycled at a suitable rate by means of the pump 20 from the last stage or one of the preceding stages of the crystallizing plant 2 and is concentrated in a thickener 15 to contain about 60 to 70% by weight salt and is then admixed to and dissolved in the feed solution before the latter enters the first crystallizing stage I. The effluent is the overflow conduit 16 from the thickener 15 is recycled to the last stage for the crystallizing plant 2.

The salt sludge has the following composition:

|  | kg/h | m³/h |
|---|---|---|
| Crystalline KCl | 47,000 | 23.690 |
| Solution | 31,330 | 25,287 |
| Total | 78,330 | 48,977 |

When that sludge has been admixed with the raw solution, the raw (strenghtened) solution 1' supplied to the crystallizing plant 2 has the following composition:

|  | grams per liter | % by weight |
|---|---|---|
| KCl | 237 | 18.8 |
| NaCl | 165 | 13.1 |
| MgCl$_2$ | 50 | 4.0 |
| CaSO$_4$ | 5 | 0.4 |
| H$_2$O | 802 | 63.7 |
| Total | 1259 | 100.0 |

The mixed solution is saturated with potassium chloride at about 90.5° C. and has an undersaturation of about 6.5 grams sodium chloride per liter. In consideration of the heat of solution the temperature of the mixed solution is about 94.0° C.

The salt sludge should be admixed to the feed solution 1 at such a rate that the crystallization will begin in any case in the first crystallizing stage I.

To avoid the accumulation of crystals in an excessive quantity in any of the crystallizing stages I to VII, part of the KCl which has been formed is withdrawn from one of the intermediate stages by means of the salt sludge pump 17 and is supplied to and collected in the centrifuges 5. The mother liquor containing the salt which has passed through the centrifuges 5 is recycled to the stage from which it has been withdrawn so that heat losses will be avoided.

The mother liquor is introduced in such a manner that the seed crystals and the fine salt contained in the mother liquor are dissolved by means of condensed vapors, which are supplied to each stage in order to suppress a precipitation of sodium chloride.

The remaining potassium chloride produced in the plant is withdrawn from the last stage or one of the preceding stages by means of the salt sludge pump 18 and is supplied to the centrifuges 5.

The treatment of the mother liquor which becomes available is subjected to a treatment which is analoguous to the processing described hereinbefore.

If the potassium chloride product is withdrawn from a stage which precedes the last stage VII, all crystallized potassium chloride which is contained in the last stage VII will be recycled to the feed solution 1 before the latter enters the first crystallizing stage I.

Because the fine potassium chloride crystals are withdrawn from the stages which are operated at relatively low temperatures and in which the crystals can grow only slowly and these fine crystals are used to increase the KCl content of the feed solution 1, the crystallization is shifted to that portion of the plant which is operated at higher temperatures so that a product having a larger mean particle size is obtained.

We claim:

1. A process for producing coarse potassium chloride crystals from a feed solution which contains sodium chloride and other impurities, comprising the steps of:
    (a) vaporizing water under vacuum from a feed composition introduced at about 95° C. into a first stage of a succession of vacuum evaporation stages of decreasing temperature in which concentrated product from one stage is introduced into the next stage of the succession, and water vapor is removed from each of said stages;
    (b) withdrawing a first slurry containing aqueous potassium chloride from an intermediate stage with respect to the succession of vacuum evaporators as a whole, and feeding said first slurry into a first separation zone, from said first separation zone separately withdrawing a first stream rich in potassium chloride crystals and a first mother liquor and feeding the first mother liquor directly into the intermediate stage from where said first slurry containing aqueous potassium chloride was withdrawn;
    (c) from a stage following the intermediate stage with respect to the succession of vacuum evaporators as a whole feeding a second slurry containing aqueous potassium chloride into a second separation zone and separately withdrawing from said second separation zone, a second stream rich in potassium chloride crystals and a second mother liquor, and feeding said second mother liquor directly into the stage following the intermediate stage from where said second slurry containing aqueous potassium chloride was withdrawn;
    (d) from a stage following the intermediate stage with respect to the succession of vacuum evaporators as a whole, withdrawing a third slurry containing aqueous potassium chloride and combining it with fresh feed solution in a buffer tank to then begin again a multistage vacuum evaporation treatment; and
    (e) combining said first and second streams rich in potassium chloride crystals and drying it to form a dry product, separating said dried product at least into a fine fraction and a coarse fraction, cooling and aminating said coarse fraction to form the coarse potassium chloride crystals and dissolving the fine fraction in water and feeding a resulting aqueous solution containing the fine fraction to a buffer tank to join with a fresh feed solution and the third slurry containing aqueous potassium chloride to begin again the multistage vacuum evaporation treatment at about 95° C.

2. The process defined in claim 1 wherein in step (d) the concentration of the third slurry containing aqueous potassium chloride is increased to 50 to 70% by weight of potassium chloride before being combined with fresh feed solution to undergo the multistage vacuum evaporation treatment.

3. The process defined in claim 1 wherein in step (e) the resulting aqueous solution containing the fine fraction of potassium chloride crystals contains 10 to 30% by weight potassium chloride.

4. The process defined in claim 1 wherein said dried product of step (e) is separated into several fractions, the fine fractions being compacted and cooled.

* * * * *